United States Patent [19]
Even

[11] Patent Number: 5,276,569
[45] Date of Patent: Jan. 4, 1994

[54] SPINDLE CONTROLLER WITH STARTUP CORRECTION OF DISK POSITION

[75] Inventor: William F. Even, Auburn, Mass.

[73] Assignee: Digital Equipment Corporation, Maynard, Mass.

[21] Appl. No.: 721,044

[22] Filed: Jun. 26, 1991

[51] Int. Cl.⁵ .......................................... G11B 15/46
[52] U.S. Cl. .................................. 360/73.02; 360/70; 360/72.2; 360/73.03; 360/75; 360/78.04; 360/78.14
[58] Field of Search .................. 360/70, 71, 72.1, 72.2, 360/73.01, 73.02, 73.03, 27, 75, 78.01, 78.04, 78.14

[56] References Cited

U.S. PATENT DOCUMENTS

| | | | |
|---|---|---|---|
| 3,893,178 | 7/1975 | Sordello | 360/73 |
| 4,206,485 | 6/1980 | Sakamoto | 360/70 |
| 4,224,645 | 9/1980 | Mauch | 360/73 |
| 4,259,698 | 3/1981 | Takada | 360/70 |
| 4,658,307 | 4/1987 | Tsuyuguchi et al. | 360/69 |
| 4,780,866 | 10/1988 | Syracuse | 360/73.03 |
| 4,855,978 | 8/1989 | Kanamaru | 369/32 |
| 4,870,643 | 9/1989 | Bultman et al. | 371/11.1 |
| 4,907,105 | 3/1990 | Kurzweil, Jr. | 360/73.02 |
| 4,908,810 | 3/1990 | Oie | 360/73.03 |
| 4,920,462 | 4/1990 | Couse et al. | 360/78.04 |
| 4,978,902 | 12/1990 | Hatagami et al. | 318/608 |
| 5,038,232 | 8/1991 | Grace | 360/73.03 |
| 5,067,033 | 11/1991 | Wakui | 360/70 |
| 5,079,654 | 1/1992 | Uno et al. | 360/78.14 |
| 5,117,315 | 5/1992 | Nagasaki et al. | 360/71 |
| 5,128,812 | 7/1992 | Uno | 360/78.06 |

FOREIGN PATENT DOCUMENTS 0064687  3/1988  Japan .................... 360/73.03

Primary Examiner—William L. Sikes
Assistant Examiner—Terry P. Cunningham
Attorney, Agent, or Firm—Albert P. Cefalo; Ronald C. Hudgens; James F. Thompson

[57] ABSTRACT

A data storage system having a number of disk drives is disclosed. Each disk drive is provided with a disk spindle driven by a spindle motor. The disk spindle is utilized for mounting one or more disks whose surface is used for data storage. A read/write head mounted on an actuator is provided for each disk surface. Each read/write head is positioned over a desired location on the disk surface by a control mechanism in order to transfer data to and from the disk surface. Data and position information are encoded on each disk surface according to a pre-specified format. The rotation of the disk spindle is controlled to maintain a desired angular position and velocity. A sensor signal indicative of the disk spindle angular position and velocity is obtained independently of the position information encoded on the disk surface. A reference signal, which is obtained from the disk surface, is combined with the sensor signal to adjust the angular position of the disk spindle.

10 Claims, 6 Drawing Sheets

SPINDLE CONTROLLER WITH STARTUP CORRECTION OF DISK POSITION

FIELD OF THE INVENTION

The invention relates to data storage devices and more particularly to multiple unit disk drive storage systems with synchronized disk spindle operation.

BACKGROUND OF THE INVENTION

Data storage systems often utilize several storage devices such as hard magnetic or optical disk drives to provide adequate permanent data storage capacity. Each hard disk drive incorporates a multiple hard magnetic or optical disk stack mounted on a spindle and driven by a motor operated at a predetermined rotational speed. Data transfer to and from each disk drive is effected by means of a plurality of read/write transducers, such as magnetic read/write heads, each one of which is associated with a disk surface and is mounted on a common actuator mechanism to enable transmission of data as well as accurate position information to and from the associated disk surface.

To ensure acceptable data access time and reliable read/write head positioning performance of the disk drive, disk spindle rotation must be accurately controlled. This objective is met by means of a phase locked loop servomechanism provided for each disk drive. The phase locked loop servomechanism operates to follow a periodic rotation reference signal provided by a command signal source. In the traditional implementation of the phase locked loop servomechanism both the frequency and the phase of a feedback signal and the periodic rotation reference signal are compared to generate an error which is regulated to an acceptably low level. Other implementations of the phase locked loop servomechanism rely only on frequency equalization or lock between the feedback signal and the periodic rotation reference signal. The frequency of the rotation reference signal corresponds to the desired rotational speed of the disk drive spindle.

With the spindle of each disk drive in the data storage system following its own rotation reference signal, the position of the currently selected read/write head relative to its disk surface at any moment of time varies from one disk drive to another. Disk surfaces of different disk drives can, therefore, be accessed only in a sequential manner and throughput is limited by the random spatial relationship between the selected read/write head and the desired location on the associated disk surface.

Significant increase in data throughput of a multiple disk drive storage system can be achieved by synchronizing the rotational motion of the spindles of a number of identical disk drives. In this arrangement the disk spindle of every disk drive in the data storage system is driven by a common reference signal. Consequently, individual disk drive spindles are accelerated and maintained at the same rotational speed. At all times, the currently enabled read/write head of each disk drive is spatially aligned relative to its disk surface in exactly the same manner as the read/write heads of all the other disk drives. This permits highly parallel data transfer operation to and from a number of the disk drives of the multiple disk drive storage system by utilizing an appropriate data storage format.

A known way of establishing identical angular alignment of the disk spindles of several disk drives with respect to the common reference signal relies on the use in each disk drive of a special disk surface and an associated read/write head which are dedicated to encoding and relaying position information for closed loop control of both the read/write head actuator and the disk spindle. A frame of reference for defining rotation of the disk spindle is given by an index signal written on the dedicated disk surface and detected once for every revolution of the disk spindle. Such an index signal can be easily recorded on every track along an appropriate radially coherent or continuous curve described by the dedicated read/write head as it is made to move across the dedicated disk surface. The radial index curve will generally take the form of a circular arc when the read/write head motion is obtained by means of a rotary actuator. Conversely, whenever the linear read/write head actuator mechanism is used, the radial index curve will be disposed along a radius on the dedicated disk surface. In any event, the resultant index signal, for example in the form of a pulse, is periodic and can be directly compared to an externally provided command signal waveform. The phase locked loop servomechanism determines the phase misalignment between the index signal and the external command signal and acts to reduce this error until the disk spindle attains the desired rotational speed and position orientation with respect to its index signal. At this time the phase locked loop servomechanism of the disk spindle is said to have acquired lock and tracks the command signal within an acceptable steady state phase error.

Phase alignment of the identical index signals, obtained from the dedicated surface of each disk drive, to a common command signal is a convenient way of synchronizing the rotational motion of the disk spindles from different disk drives. As new requests to transfer data are processed, one disk surface from each disk drive can be selected for immediate access simultaneously.

A difficulty of employing such disk surface recorded position information for disk spindle control arises with disk surface data formats that preclude the use of a disk surface and read/write head dedicated to position information processing. Instead, such position information is encoded on all disk surfaces of each disk drive along with the data. To utilize the data storage capacity of a disk drive efficiently, the position information may be embedded along the boundaries of circumferentially organized continuous sectors containing blocks of data. Data and position information can be placed on a disk surface in a variety of formats according, inter alia, to the disk drive performance characteristics. Since the position information is obtained from the currently selected disk surface, each surface of the disk drive must contain its own index signal for disk spindle control.

As the disk drive receives a request to access data located on another of its disk surfaces, a switch to the new read/write head is made and the phase locked loop servomechanism discontinues processing of the index signal from the previously selected disk surface and initiates detection of the new index signal on the newly accessed disk surface. Any angular misalignment between the two index signals which may be desirable, for example, to enhance the speed of formatting the disk surfaces, creates a phase error between the command signal and the feedback index signal which is acted upon by the phase locked loop servomechanism to create a corrective action. Consequently, data transfer is delayed until the process of re-acquiring lock with respect to the new index signal, occurring over a period of time dependent upon the dynamic characteristics of the phase locked loop servomechanism, is complete.

Another disadvantage of embedding the index information on the disk surface at the boundaries of the data blocks is the constraint imposed on the choice of data formats. Since such embedded index signal must be located along a radially coherent or continuous curve on each disk surface of the disk drive, any acceptable data format must ensure that the data area boundaries align along that curve. However, to ensure uniform aerial bit density throughout the disk surface, it may be desirable to have a greater number of data areas or sectors on outward tracks than on the tracks proximal to the center of the disk surface. To this end, bands of radially contiguous tracks can be grouped together to conform to a distinct sector format making sector alignment along any one radially coherent or continuous curve on the disk surface highly undesirable.

SUMMARY OF THE INVENTION

The invention is a data storage system utilizing a number of identical storage devices such as hard magnetic disk drives or optical disk drives. Each of the disk drives is provided with a spindle driven by a direct current motor. The disk spindle is used to mount a plurality of disks whose surfaces are utilized for data storage. To access data on the disk surfaces, each disk drive is additionally provided with data read/write transducers, usually one for each disk surface, such as the read/write heads which are attached to a common actuator mechanism. Motion of the disk spindle and the read/write actuator is controlled by separate servomechanisms capable of ensuring desired rotational speed of the disk spindle and relative position of the read/write heads with respect to the disk surfaces.

To ensure that the disk spindle of each disk drive rotates at the same speed and exhibits the same angular alignment, the phase locked loop servomechanism controlling the disk spindle is provided with a sensor signal derived directly from the direct current motor. The sensor signal may be obtained as the output of one of the Hall effect sensors used in commutation of the motor or as a filtered output of a zero crossing detector responsive to the back emf signal of the direct current motor. Regardless of its source, the sensor signal is periodic with a frequency equal to an integer multiple of the spindle rotational frequency. A feedback signal is generated by dividing the frequency of the sensor signal by an integer such that the frequency of the feedback signal is equal to the rotational frequency of the disk spindle. The feedback signal is then compared to a command signal. The error between the command signal and the feedback signal is determined to produce a corrective action in the phase locked loop servomechanism until the desired rotational speed is achieved.

Synchronization of the rotation of the disk spindles of each of the disk drives included in the storage system requires the execution of a servowriting process performed by the read/write circuitry and initiated upon successful acquisition of phase lock between the command signal to each disk spindle and an arbitrary edge of the feedback signal and follows the same data and position information format applied to each disk surface of every disk drive.

In subsequent disk spindle operation the phase locked loop servomechanism is initially allowed to acquire lock to an arbitrary edge of the sensor signal. Thereafter, the angular position of the disk spindle is determined by counting the time elapsed between the occurrence of an edge of the command signal or the aligned edge of the feedback signal and the detection by a read/write head of the position of a reference sector by reading the information contained in the sector header. The reference sector can be the lowest numbered sector on the disk surface. This time lag value is compared with the known table values in a phase shift detector representing the possible phase misalignment between the reference sector and the disk spindle to determine the phase shift between the actual and the desired position of the disk spindle.

To bring the disk spindle into position proximal to the reference sector, the frequency divider is re-triggered the appropriate number of times and the phase locked loop servomechanism responds to the resultant phase error with a corrective action. As the disk spindle of each disk drive is realigned with respect to the reference sector, the entire storage system is made responsive to a common command signal defining the disk spindle rotation.

A more detailed understanding of the invention may be had from the following description of the preferred embodiment, given by way of example, to be read in conjunction with the accompanying drawings, wherein

DETAILED DESCRIPTION

Figure 1:
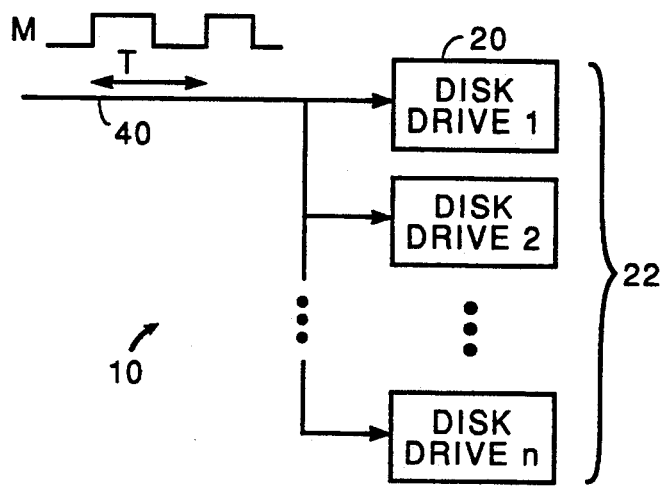
FIG. 1 is a block diagram of a multiple data storage device system.
Figure 2:
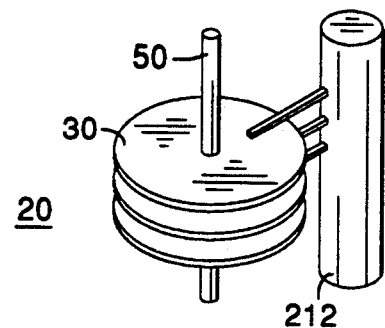
FIG. 2 is a simplified diagram of a disk drive included in a multiple data storage device system of FIG. 1 and showing the relationship between the disk spindle and the read/write head actuator.

Referring now to the drawings, and in particular to FIGS. 1 and 2, there is shown a data storage system 10 consisting of a plurality of disk drives 20 arranged in the form of a disk array 22 in which rotation of each disk stack 30 (see FIG. 2) of each disk drive 20 is synchronized to a common master command signal M supplied by a command signal source (not shown). The command signal source can be external to each of disk drives 20 or be an output signal of one of disk drives 20, as described in greater detail below. Master command signal M is coupled to the input terminal of each disk drive 20 via line 40. Master command signal M is a periodic signal, such as a square waveform signal having a predetermined period T.

Both angular velocity of each disk stack 30 and its angular alignment with respect to disk stack 30 of any other disk drive 20 are identical across the disk array 22 during the operation of data storage system 10.

As is further depicted in FIG. 2, each disk stack 30 is mounted inside disk drive 20 by means of a disk spindle 50 with all disk stacks 20 being accessed for reading and writing data by an actuator 212.

Figure 3:
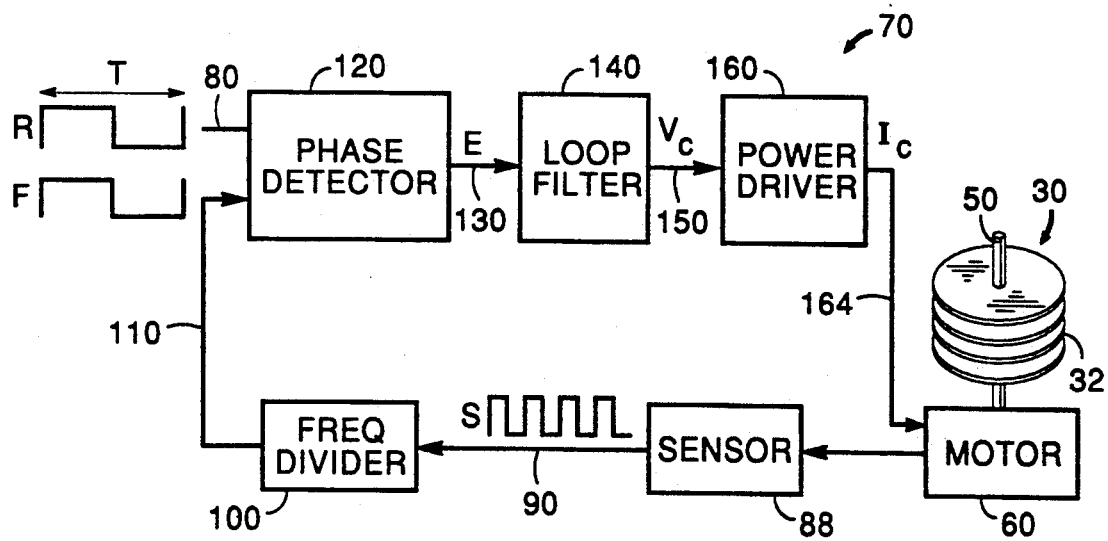
FIG. 3 is a block diagram of a typical phase locked loop servomechanism architecture FIG. 2.

FIG. 3 shows a block diagram of a phase locked loop servomechanism 70 used for control of disk spindle 50 which is driven by a motor such as a direct current motor 60. A command signal R is of square waveform of period T corresponding to a desired single revolution of disk spindle 50. The command signal R is generated by an external command signal source (not shown) and is coupled to a first input terminal of a phase detector 120 via line 80. The command signal R is generated from the master command signal M for phase locked loop servomechanism 70 of each disk drive 20. The second input to phase detector 120 is generated as follows. An output terminal of a sensor 88 generates a sensor signal S, shown as a square wave of four pulses for one revolution of disk spindle 50, to provide a signal indicative of the angular velocity of direct current motor 60. The sensor signal S is supplied to an input terminal of a frequency divider 100 via line 90. The output terminal of frequency divider 100 then supplies a feedback signal F to the second input terminal of phase detector 120 via line 110. The output of phase detector 120 is an error signal E which is generally proportional to the difference in phase between the command signal R and the feedback signal F. The error signal E is supplied as an input to a loop filter 140 via line 130. The output of loop filter 140 supplies a voltage command signal Vc via line 150 as an input to a power driver 160. The output of power driver 160 is a drive signal such as a current command signal Ic which is supplied to direct current motor 60 via line 164, to thereby control the speed of direct current motor 60 and, hence, the angular velocity of disk spindle 50.

In operation, in order to acquire and maintain a given rotational speed, disk spindle 50 is controlled by phase locked loop servomechanism 70 which operates to minimize error signal E between the actual rotation and desired rotation of the disk spindle by tracking the command signal R of a predefined period T.

For generating a signal representative of the actual speed of rotation of disk spindle 50, sensor signal S on line 90 is derived from the output of sensor 88 mounted on the stationary portion (not shown) of direct current motor 60 to provide a signal representative of the angular velocity of motor 60. This can be accomplished from any one of the plurality of Hall effect sensors usually provided for commutation of the generally three phase armature (not shown) of direct current motor 60. Alternatively, sensor signal S can be generated by means of detecting and properly filtering the zero level crossings of the back emf signal of direct current motor 60 since the frequency of the zero level crossings of the back emf signal is proportional to the angular velocity of disk spindle 50. When a rotor construction with multiple magnetic poles is employed for direct current motor 60, the number of pulses exhibited by the sensor signal S for each revolution of disk spindle 50 equals the number of the rotor pole pairs. For example, for the rotor constructed with 8 magnetic poles, the number of pulses of the sensor signal S for each revolution of disk spindle 50 equals 4.

In this periodic form, the sensor signal S is supplied as the input to frequency divider 100. Frequency divider 100 is a standard divide by N or N bit counter where N is equal to the number of pole pairs of motor 60. The N bit counter is incremented each time a pulse edge of predetermined polarity, such as the rising pulse edge of the sensor signal S, appears at its input. The output of frequency divider 100 undergoes a transition each time its most significant bit (MSB) is changed. As a result, the feedback signal F at the output of frequency divider 100 is a square waveform whose frequency is 1/N times the frequency of the sensor signal S at the input to frequency divider 100. The frequency of the feedback signal F thus equals the angular velocity of disk spindle 50. The phases of the command signal R and the feedback signal F are compared by phase detector 120 which generates the error signal E proportional to the phase difference between the command signal R and the feedback signal F. The error signal E at the output of phase detector 120 is in turn coupled to the input terminal of loop filter 140. Loop filter 140 responds by outputting the voltage command signal Vc which is supplied as the input to power driver 160 which responds by issuing the current command signal Ic. The current command signal Ic is an input to direct current motor 60 which applies the corresponding mechanical torque to drive disk spindle 50. The loop is thus closed inducing phase locked loop servomechanism 70 to act in such a manner as to reduce phase error E at the output of phase detector 120 and achieve the waveform phase alignment or phase lock between the command signal R and the feedback signal F at the two inputs of phase detector 120.

Once this phase alignment has occurred, phase locked loop servomechanism 70 is said to operate in steady state. Disk spindle 50 will continue rotation at the desired angular velocity which is defined by the frequency of the command signal R.

Figure 4:
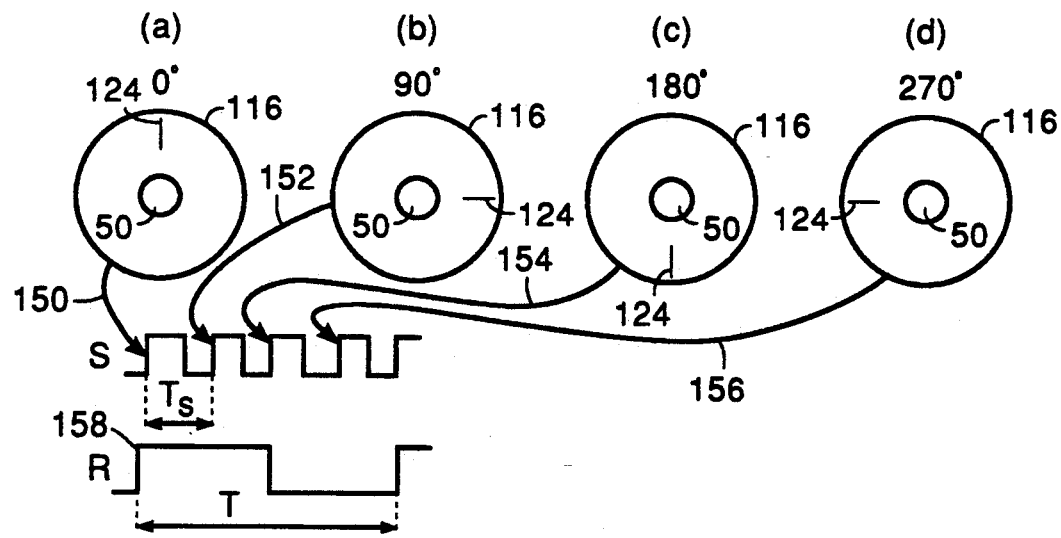
FIG. 4 is a diagram depicting, by way of example, four phase relationships between reference sector position and the command signal to the phase locked loop servomechanism of FIG. 3.

FIG. 4 portrays four possible phase displacements between command signal R and the location of a position reference such as reference sector boundary 124 on disk surface 116 for an eight pole rotor construction of direct current motor 60. FIG. 4 shows, by way of example, four angular positions of a disk surface 116 of one of the disks 32 in disk stack 30 mounted on disk spindle 50 (shown in FIG. 3). Each angular position, denoted by (a) through (d) in FIG. 4, corresponds to one of the four rising edges of the sensor signal S. Each angular position (a) through (d) of disk surface 116 in FIG. 4 is also associated with the corresponding angular position of a reference sector boundary 124. Reference sector boundary 124 may be the boundary of the lowest numbered or zero sector on disk surface 116.

The four possible phase relationships (a)-(d) correspond to the number of pulses in the sensor signal S which is in turn determined by the number of pole pairs making up the multiple pole rotor (not shown) of direct current motor 60 (FIG. 3). For example, if the rotor of direct current motor 60 is of an eight pole construction, the sensor signal S will consist of four pulses per revolution of disk spindle 50, each pulse corresponding to an armature phase voltage of positive polarity.

When phase locked loop servomechanism 70 is operating in steady state, the command signal R is in phase with the feedback signal F. Each one of the four angular positions (a) through (d) of reference sector boundary 124 is associated with a pulse edge of the sensor signal S whose frequency is taken, by way of example, to be four times the frequency of the command signal R, as shown in FIG. 4. Proper alignment of disk spindle 50 with respect to the command signal R is shown in diagram (a) of FIG. 4 where reference sector boundary 124 coincides with a first pulse edge 150 of the sensor signal S. This alignment between reference sector boundary 124 and first pulse edge 150 gives a zero phase shift between the command signal R and the reference sector boundary 124. Disk spindle lock with respect to edges 152, 154, and 156 of the sensor signal S represents, respectively, a phase shift of 90, 180, and 270 degrees between reference sector boundary 124 and the command signal R. Pulse edge 150 is aligned in phase with the pulse edge 158 of the command signal R. There is thus no phase shift in (a) between the angular position of the reference sector boundary 124 and the command signal R. Position (b) of reference sector boundary 124 is associated with the second pulse edge 152 of the sensor signal S. Since the period Ts of the sensor signal S in the example of FIG. 4 is ¼ that of the command signal period, the second pulse edge 152 of the sensor signal S, and the angular position of reference sector boundary 124, lag the pulse edge 158 of the command signal R by 90 degrees. Similarly, the angular position (c) of reference sector boundary 124 corresponds to the third pulse edge 154 of the sensor signal S. This angular position of reference sector boundary 124 lags the command signal R by 180 degrees. Last, the angular position (c) of reference sector boundary 124 which corresponds to the fourth pulse edge 156 of the sensor signal S lags the command signal R by 270 degrees. The use of the angular position of reference sector boundary 124 to adjust the angular position of disk spindle 50 is described in more detail below.

Figure 5:
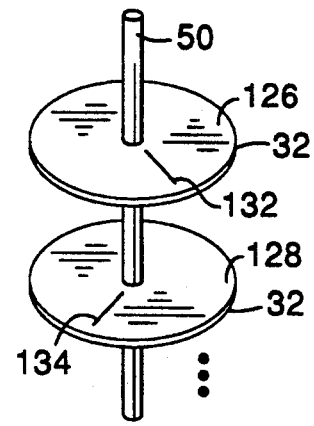
FIG. 5 illustrates two adjacent disks mounted on a disk spindle of FIG. 3.

FIG. 5 shows, by way of example, two adjacent disks 32 mounted together on a disk spindle 50. Angular position of an upper disk surface 126 of the upper disk 32 is determined by detecting an index signal once for each revolution of the disk. The index signal is written on each track of upper disk surface 126 along a continuous upper radial index curve 132. Similarly, a lower disk surface 128 on the adjacent lower disk 32 has an index signal written on each track along a continuous lower radial index curve 134. Each track of disk surfaces 126 and 128 is also used to store data along with the additional disk position information (not shown).

An index signal written along upper radial index curve 132 and encountered once for each revolution of the disk 32 may be the sole indicator of the angular position of upper disk surface 126. However, the radial index curves on different disk surfaces may be misaligned. For example, to access a new disk surface, such as lower disk surface 128, the associated read/write head (not shown) is selected. Since the selected read/write head is required to detect the index signal along the lower radial index curve 134 on the newly selected lower disk surface 128, it may initially detect the index signal after some delay or initially miss the index signal due to the angular misalignment of upper radial index curve 126 and lower radial index curve 128. Consequently, phase locked loop servomechanism 70 (FIG. 3) is forced to react to an instantaneously very large phase error E and to exhibit a considerable transient response resulting in unacceptable data access latency until a new steady state is reached.

The disk spindle synchronization procedure of the invention advantageously does not rely on detecting the index signals written on each disk surface along continuous radial index curves, such as upper and lower radial index curves 132 and 134, to determine the angular position and velocity of disk spindle 50. Writing such an index signal on each disk surface of each disk 32 of disk stack 30 (see FIG. 3) of every disk drive 20 (see FIG. 2) is highly undesirable whenever, due to design considerations, disk position information is fully embedded within the data on each disk surface, as shown in FIG. 5. As each disk drive 20 (see FIG. 2) is requested to access various disk surfaces to store or retrieve data, phase locked loop servomechanism 70 (see FIG. 3) must acquire lock to a new index signal written on the accessed disk surface.

Referring again to FIG. 5, the radial index curves 132 and 134 containing the index signals on the adjacent disk surfaces 126 and 128 may not be aligned precisely. For example, to expedite the servowriting process, angular location of the radial index signal on upper disk surface 126 may have to be displaced relative to that on the lower disk surface 128.

In order to increase the linear data density, greater number of data sectors may be placed along the outward tracks of a disk surface than the tracks close to the disk surface center. It is likely that such varied sector formats may not have sector boundaries aligned along any continuous radial index curve on the disk surface.

Figure 6:
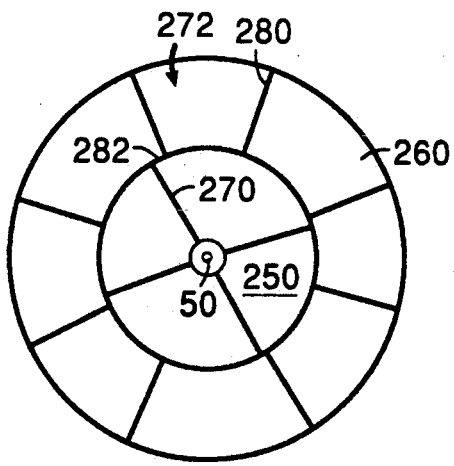
FIG. 6 is a simplified example of a disk surface having a banded sector format.

FIG. 6 shows, by way of example, a banded disk surface 272 having two track bands. The tracks closest to the center of disk surface 272 are arranged into a circular inner track band 250 with four sectors separated by generally radially extending inner sector boundaries 270. In contrast, the outer tracks are organized into an outer track band 260 with 8 sectors whose generally radially extending sector boundaries 280 do not align with sector boundaries 270 of inner track band 250. This sector boundary discontinuity between the adjacent track bands makes it impossible to write an index signal along a continuous radial index curve on each disk surface. As a result, the banded data format cannot be used with the phase locked loop servomechanisms which derive the angular position of disk spindle 50 exclusively from the disk surface, such as shown in FIG. 5.

In contrast, using the sensor signal S to control the position of disk spindle 50, distinct from any disk surface information, removes the constraint on the choice of the data format. To offer the flexibility of arbitrary data sector format selection, the sensor signal S is derived from the operation of direct current motor 60, shown in FIG. 3 and described in greater detail below.

Figure 7:
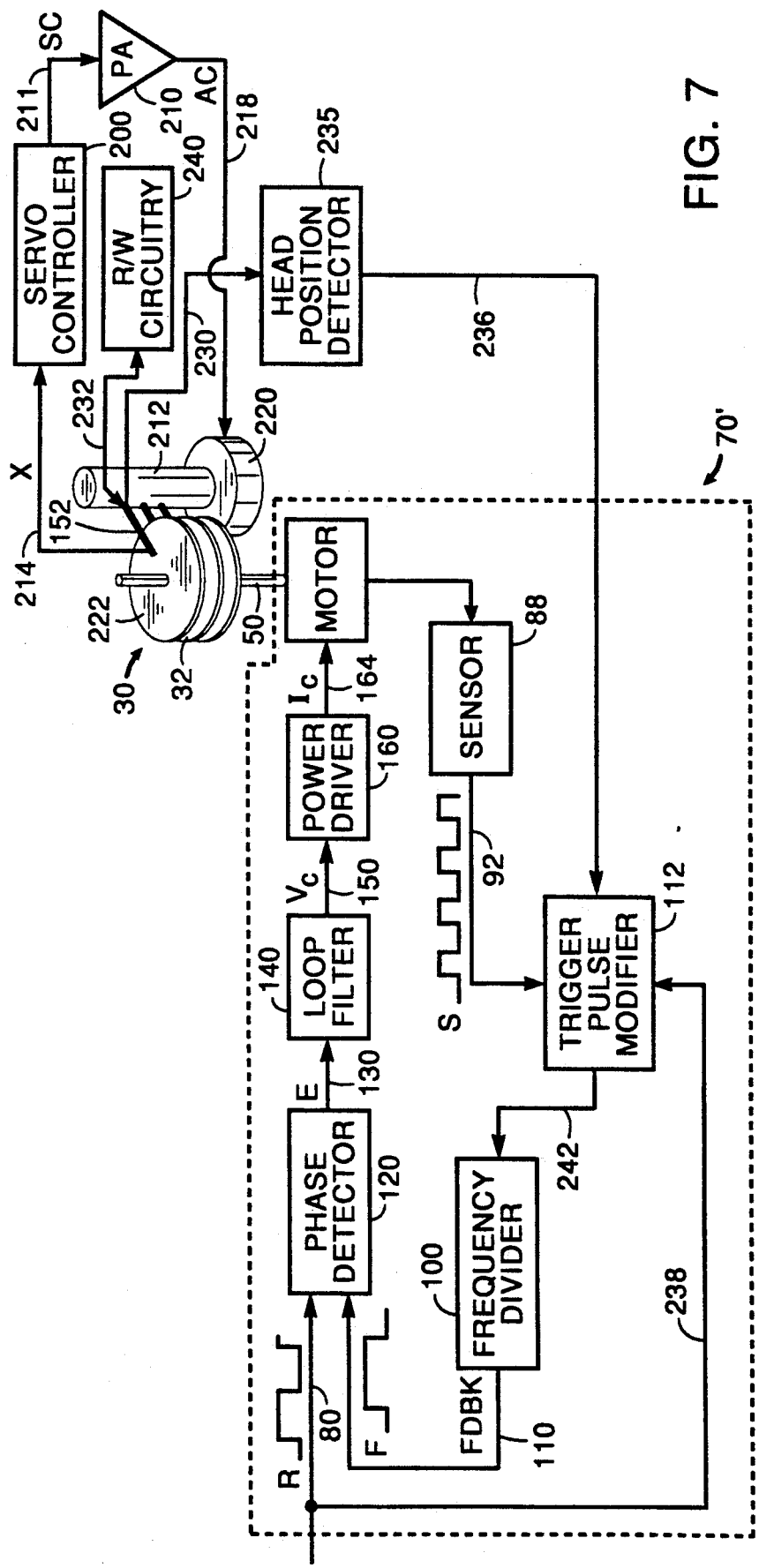
FIG. 7 is a block diagram of the phase locked loop servomechanism architecture utilizing a combination of a spindle motor feedback signal and reference sector signal for control of the disk spindle in FIG. 3.

FIG. 7 in which the interconnection and operation of the like numbered blocks is the same as described in connection with FIG. 3 above, depicts, inter alia, a modified phase locked loop servomechanism 70' delineated by a broken line. Components described earlier in connection with FIG. 3 perform the previously described functions and will not be described in detail, that is frequency divider 100, phase detector 120, loop filter 140 and power driver 160. For simplicity of illustration in FIG. 7, a single read/write head 152 is shown mounted on an actuator 212 which is driven by an actuator motor 220. It is to be understood that each disk surface of disks 32 in disk stack 30 is associated with a read/write head (not shown) which is mounted on actuator 212 in a manner analogous to the mounting of read/write head 152. Read/write head 152 is suspended in proximity to a sample disk surface 222 of one of the disks 32 in disk stack 30. Read/write head 152 supplies a position error signal X, which is read from sample disk surface 222, to an input terminal of a servo controller 200 via line 214. An output terminal of servo controller 200, which supplies a servo command signal SC, is coupled to an input terminal of a power amplifier 210 via line 216. The output terminal of power amplifier 210, which supplies an actuator command signal AC, is coupled to actuator motor 220 via line 218.

An input/output terminal of a read/write circuitry 240 is coupled to an output/input terminal of read/write head 152 and all other read/write heads (not shown) via line 232. The output terminal of read/write head 152 is also coupled to an input terminal of a head position detector 234 via line 230. The output terminal of head position detector 234 is in turn coupled to the first input terminal of a trigger pulse modifier 112 via line 236. The second input terminal of trigger pulse modifier 112 receives the command signal R via line 238. The output terminal of sensor 88, supplying the sensor signal S, is coupled to the third input terminal of trigger pulse modifier 112 via line 92. An output terminal of trigger pulse modifier 112 is coupled to an input terminal of frequency divider 100 via line 242.

In operation, servo controller 200 acts upon the position error signal X to generate the servo command signal SC which is supplied to the input terminal of power amplifier 210 via line 216. Power amplifier 210 transforms the servo command signal SC into the actuator command signal AC which is supplied to the input terminal of actuator motor 220 via line 218. The loop around actuator 212 is thus closed and servo controller 200 acts to regulate the position error signal X to an acceptably low level. Head position detector 234 obtains the sector header information, provided for each sector on the track, as its input which is read by read/write head 152. Once the header of the reference sector is read, head position detector 234 generates a pulse which occurs once for every revolution of disk spindle 50.

To access data on a destination track (not shown) on disk surface 222, servo controller 200 issues the servo command signal SC to power amplifier 210. Power amplifier 210 in turn produces a corresponding actuator command signal AC to actuator motor 220. Actuator motor 220 moves actuator 212 together with read/write head 152 to position the read/write head in proximity to the destination track on disk surface 222.

Read/write circuitry 240 selects the appropriate read/write head for disk surface access, enables data transfer from the selected read/write heads, such as read/write head 152, and initiates data transfer to and from the respective disk surface. Once the position error signal X is reduced to an acceptably low level by the servo controller activity, read/write head 152 is able to transfer data between the destination track on disk surface 222 and read/write circuitry 240.

Referring again to FIGS. 1 and 2, to effect synchronization of the disk spindles 50 of all disk drives 20 of disk array 22, every disk drive 20 of the disk array initially undergoes a servowriting procedure to create a format for data and embedded read/write head positioning information which is performed by read/write circuitry 240 on each disk surface of disk stack 30 (FIG. 7). To prepare disk drive 20 for the servowriting process, phase locked loop servomechanism 70 is operated to acquire lock to an arbitrary edge of the sensor signal S. Once the command signal R and the feedback signal F at the respective input terminals of phase detector 120 are lined up in phase, phase locked loop servomechanism 70 is operating in steady state. The servowriting process is then triggered by an edge of the command signal R or the feedback signal F, which is derived from the sensor signal S, to lay out the required data sector and embedded positioning servo information (not shown) on each disk surface of every disk 32 in disk stack 30. As a result, a known phase relationship is established between the location of the data and the embedded positioning servo information on each disk surface and the corresponding edge of the sensor signal S. This in turn relates the position of the data sectors and positioning servo information to the spatial orientation of the pole pairs of motor 60. The need for an index written along a radially continuous curve along the entire disk surface to ascertain the angular position of disk spindle 50 is thus eliminated. Since the data format on each disk surface of every disk 32 is known, the spatial orientation of disk spindle 50 can be uniquely determined and its desired angular position obtained with respect to the appropriate edge of the command signal R or, equivalently, the feedback signal F.

In the next phase of the disk spindle synchronization process, disk spindle 50 of each disk drive 20 (FIGS. 2 and 3) is allowed to attain the desired angular velocity with its associated phase locked loop servomechanism 70 locking on to an arbitrary edge of the sensor signal S at the output of sensor 88 to provide an input to frequency divider 100 which generates the feedback signal F on line 110. Phase locked loop servomechanism 70 is allowed to acquire lock to an arbitrary edge of the sensor signal S and to begin operating in steady state. However, since phase locked loop servomechanism 70 can phase lock to any one of the integral number of pulse edges 150, 152, 154 or 156 of the sensor signal S generated during a complete revolution of disk spindle 50, the absolute position of disk stack 30 in space is indeterminate. In order to establish a desired reference for the disk surface position, an angular alignment of each disk spindle 50 is performed as described in greater detail below.

Figure 8:
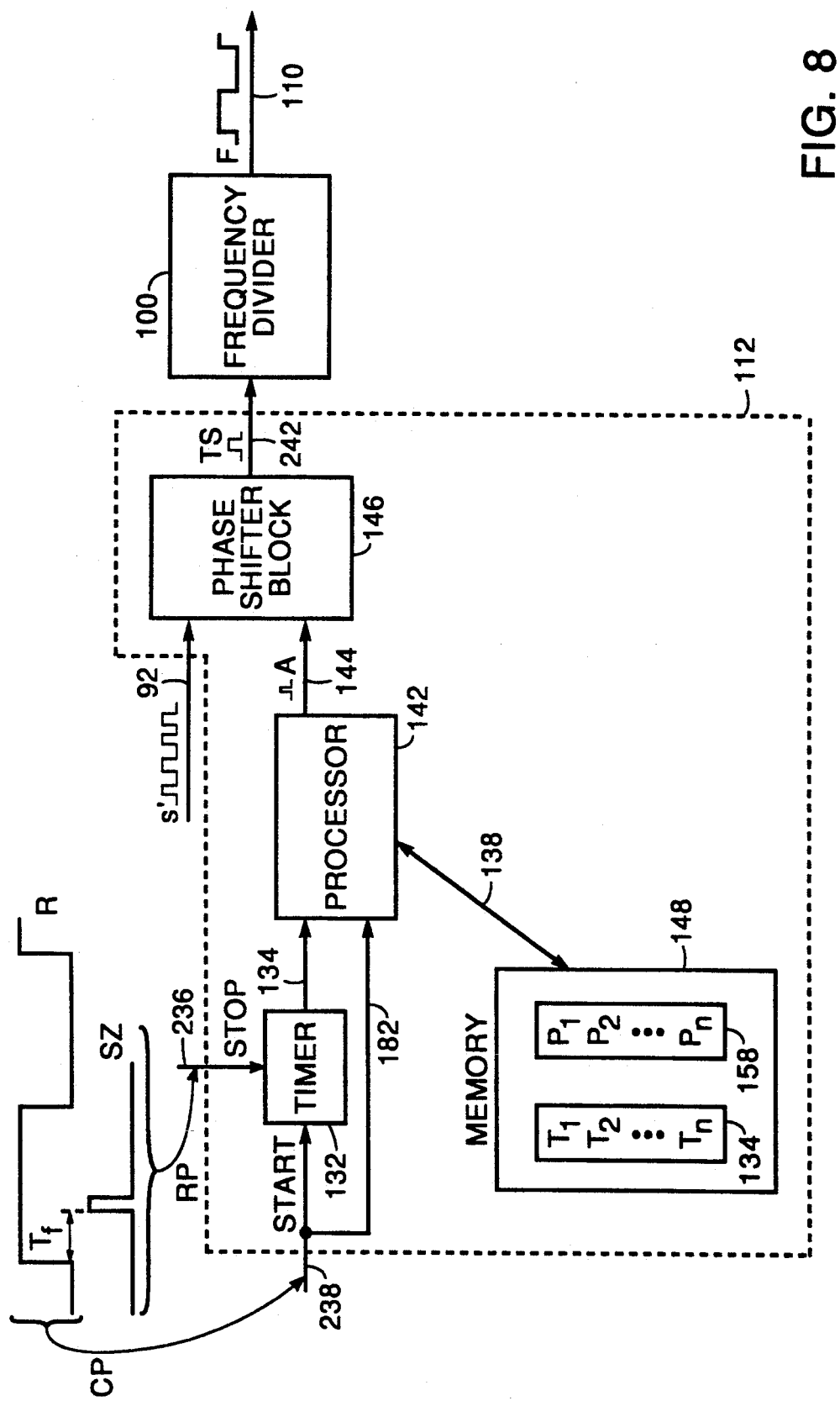
FIG. 8 is a block diagram of the trigger pulse modifier of FIG. 7.

FIG. 8 illustrates the detailed configuration of the trigger pulse modifier 112 shown in FIG. 7. The first input terminal, denoted as START in FIG. 8, of a timer 132 receives the externally supplied reference signal R via line 238. The output terminal of head position detector 234 is coupled to the second input terminal of timer 132, denoted as STOP in FIG. 8, via line 236. The output terminal of timer 132 is coupled to a first input terminal of a processor 142 via line 34. Processor 142 receives the command signal R at its second input terminal via line 182. A memory 148 has its output terminal coupled to the third input terminal of processor 142 via line 138. Memory 148 contains a time table 134 and a pulse number table 158. An output terminal of processor 142 is coupled to the first input terminal of a phase shifter block 46 via line 144. The output terminal of sensor 88 (FIG. 7), which supplies the sensor signal S, is coupled to the second input terminal of phase shifter block 146 via line 92. The output terminal of phase shifter block 146 is in turn coupled to the input terminal of frequency divider 100 via line 242.

In operation, timer 132 is triggered to start accumulating a value by a transition, such as a rising pulse edge, of the command signal R supplied to the timer's START input terminal. Since the feedback signal F (FIG. 7) and the command signal R are aligned in phase due to the previously acquired phase lock, timer 132 may be alternatively triggered by a rising edge of the feedback signal F. Timer 132 continues accumulating the value until the head position detector 234, depicted in FIG. 7, detects a transition, such as a rising edge, of a reference sector signal SZ which is read by read/write head 152 from disk surface 222. The reference sector signal SZ represents the position of reference sector boundary 124 on the disk surface 222 (FIG. 7). The rising pulse edge of the reference sector signal SZ is supplied via line 236 to the STOP input terminal of timer 132 to stop the accumulation process and capture the value in timer 132.

The phase shift value Tf thus accumulated and captured in timer 132 measures the time interval representing the phase shift between a command pulse edge CP of the command signal R and a reference pulse edge RP of the reference sector signal SZ. The phase shift value Tf is supplied via line 134 to processor 142 which compares it against a set of predetermined values T1, T2, . . ., TN in time table 134 and finds a value Ti (i=1,2, . . ., N) which lies within a predetermined tolerance of the phase shift value Tf. The values Ti in time table 134 represent the possible phase misalignments between the command pulse edge CP and the reference pulse edge RP.

The number of possible phase relationships between the command signal R and the position of reference sector boundary 124 is illustrated, by way of example, in FIG. 4 which was discussed above. Referring again to FIG. 4, if the frequency of the sensor signal is four times the frequency of the command signal R, the four possible phase shifts between the phase of the command signal R and the position of the reference sector boundary 124 are depicted by graphs (a)-(d). In this case N=4 and time table 134 contains four time values T1, T2, T3, T4. T1 corresponds to the command signal R and the position of reference sector boundary 124 being in phase, as depicted in diagram (a). In particular, T1 may be equal to zero. Similarly, T2 corresponds to the phase lag of 90 degrees shown in diagram (b), T3 corresponds to the phase lag of 180 degrees as shown in diagram (c), and T4 corresponds to the phase lag of 270 degrees, as shown in diagram (d).

Referring again to FIG. 8, the result of the comparison between the phase shift value Tf and the time values Ti (i=1,2,3,4) in time table 134 made by processor 142 is to find the time value Tc which is the closest to the phase shift value Tf(within a predetermined tolerance). Corresponding to each time value Ti in time table 134 is a matching pulse number Pi (i=1,2,3,4) contained in a pulse number table 158 within memory 148. Once processor 142 determines the time value Tc closest to the phase shift value Tf, it retrieves the corresponding pulse number Pc from pulse number table 158. Processor 142 then generates an auxiliary trigger signal A having a sequence of pulses whose number is equal to Pc. The auxiliary trigger signal A is supplied to the second input of phase shifter block 146 via line 144. Phase shifter block 146, which may be an OR gate, responds with a trigger signal TS on line 242 to either the first input pulse edge of the sensor signal S on line 92 or the second input pulse edge of the auxiliary trigger signal A on line 144. Each additional pulse of the auxiliary trigger signal A is said to be inserted into the trigger signal TS. Each pulse of the trigger signal TS appearing at the input to frequency divider 100 increments the state of the frequency divider. Since each pulse of the auxiliary trigger signal A generates a corresponding pulse in the trigger signal TS, the feedback signal F at the output of frequency divider 100 can be advanced in phase by 90, 180, or 270 degrees, by generating one, two, or three additional pulses of the auxiliary trigger signal A. If no additional pulses appear in the auxiliary trigger signal A on line 144, phase shifter block 146 responds to the pulses of the sensor signal S only. As a result, the feedback signal F at the output of frequency divider 100 is synchronized to the sensor signal S.

Figure 9A:
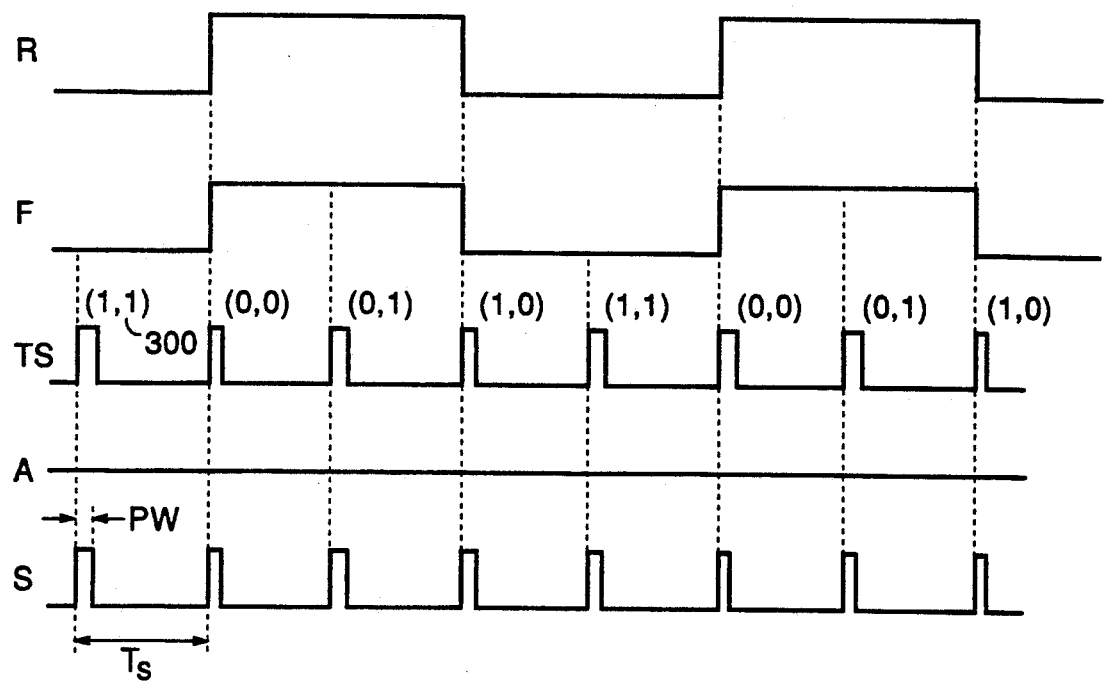
FIGS. 9a and 9b illustrate the timing diagrams of signals shown in FIG. 8.
Figure 9B:
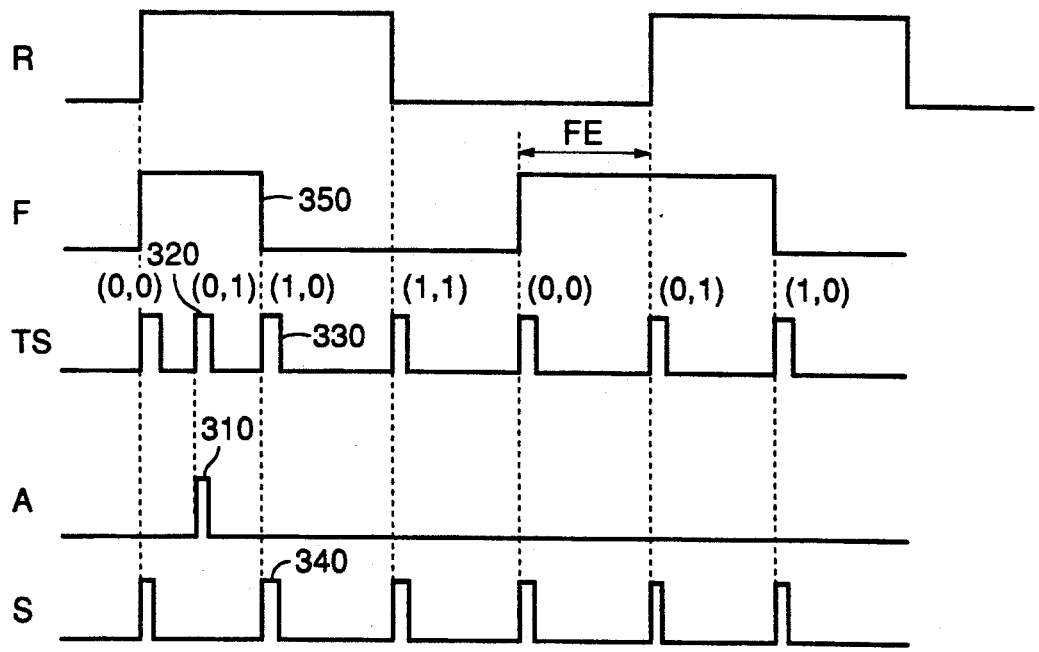

FIG. 9 depicted in two parts as FIGS. 9a and 9b, illustrates timing diagrams for the signals appearing in FIG. 8. Referring to FIG. 9a, the top signal in the timing diagram is the command signal R. With phase locked loop servomechanism 70 (FIG. 7) operating in steady state, the error signal E is sufficiently small so that the feedback signal F immediately below the command signal R is in phase with the command signal R, as indicated by the dashed vertical lines in FIG. 9a. In the absence of pulses in the auxiliary signal A, each pulse of the sensor signal S is in phase with a corresponding pulse of the trigger signal TS. Each pulse in the trigger signal TS increments the state of the two bit frequency divider 100 (FIG. 7), as illustrated in FIG. 9a by the bracketed pairs 300 of numbers immediately above each pulse in the trigger signal TS. A transition in the feedback signal F coincides with a change in the most significant bit MSB of frequency divider 100, shown as the left number in each bracketed pair 300.

The timing diagram in FIG. 9b illustrates the insertion of a single additional pulse 310 in the auxiliary signal A. Phase shifter block 146 (FIG. 7) produces a corresponding pulse 320 in the trigger signal TS which changes the state of frequency divider 100 from (0,0) to (0,1). The state of the frequency counter is incremented again to (1,0) by a pulse 330 in the trigger signal TS which occurs in response to a pulse 340 in the sensor signal S. Since the most significant bit MSB of frequency divider 100 (FIG. 7) changed from 0 to 1, transition 350 in the feedback signal F is advanced by 90 degrees. Thereafter, transitions in the feedback signal F occur at the frequency of the sensor signal S. However, as a result of inserting the additional pulse 320 into the trigger signal, the feedback signal F is now shifted in phase from the command signal R by a phase angle FE. The phase angle FE is equal to 90 degrees since in the example of FIG. 9 the frequency of the sensor signal S is taken to be four times the frequency of the feedback signal F.

Similarly, generation of two additional pulses in the auxiliary trigger signal A will insert two corresponding pulses in the trigger signal TS. The state of frequency divider 100 (FIG. 7) will be incremented twice. As a result, the feedback signal F will be shifted in phase from the command signal R by the phase angle FE equal to 180 degrees. Insertion of a third additional pulse in the trigger signal TS will produce the phase shift of 270 degrees.

Referring again to FIG. 7, the phase angle FE is detected by phase detector 120 which responds with a proportional error signal E. Phase locked loop servomechanism 70 will respond to the error signal E by altering the angular position of disk spindle 50 until the error signal E is reduced to a sufficiently low level. The phase angle FE will also approach a small enough value so that the feedback signal F and the command signal R (FIG. 9b) are aligned in phase. The new angular position of disk spindle 50 corresponds to the phase alignment of the reference sector signal SZ and a pulse edge CP of the command signal R which yields a zero phase shift value Tf.

Referring now to FIG. 9b, a pulse in the sensor signal S and a pulse in the auxiliary trigger signal A may occur simultaneously. This pulse collision causes the trigger signal TS at the output of phase shifter block 142 to exhibit only one pulse. The state of frequency divider 100 is thus be incremented only once and the desired frequency shift in the feedback signal F will not be produced. As a result of such pulse collision, the phase shift value Tf will remain unchanged and will be detected by timer 132, as shown in FIG. 8, and the pulse insertion will be retried until it successfully produces the desired phase shift in the feedback signal F. Alternatively, processor 134 may generate the additional pulse in the auxiliary signal A after a predetermined delay following the detection of a pulse edge CP in the command signal R to avoid the collision with the sensor signal pulses.

If the duty cycle of the sensor signal S, defined as the ratio of a pulse width PW to the sensor signal period Ts (FIG. 9(a)) is large, pulse collision between the sensor signal S and the auxiliary signal A may persist even after a number of attempts at pulse insertion.

Figure 10:
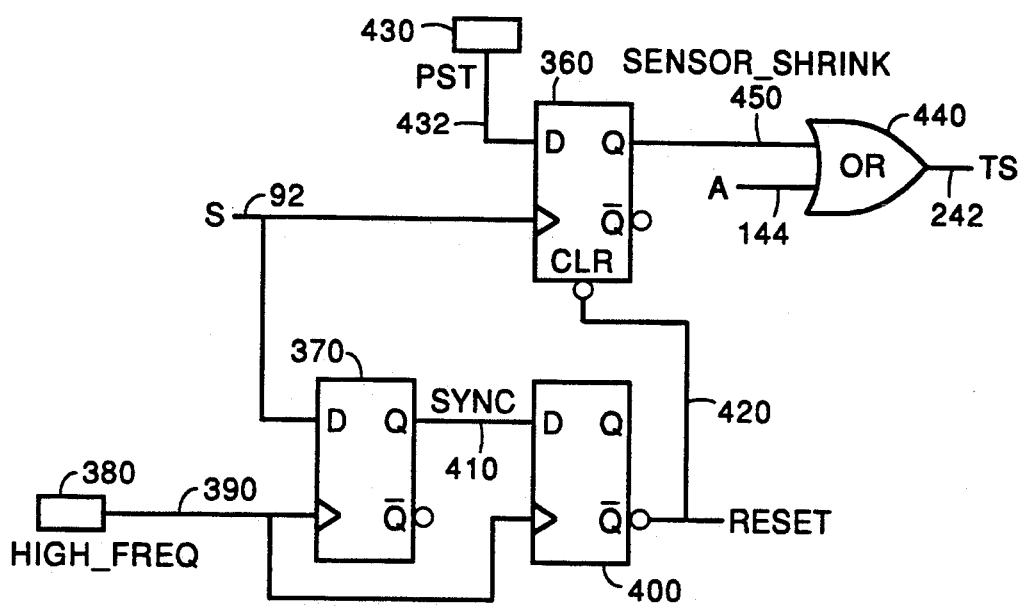
FIG. 10 is a block diagram of the phase shifter block of FIG. 8.

FIG. 10 shows another embodiment of phase shifter block 146 (FIG. 8). Referring to FIG. 10, the output terminal of sensor 88 (shown in FIG. 7) is coupled to a clock input terminal of a positive edge triggered D flip-flop 360 and a D input terminal of a positive edge triggered D flip-flop 370 via line 92. An output terminal of a clock signal source 380 is coupled to a clock input terminal of flip-flop 370 and a clock input terminal of a positive edge triggered D flip-flop 400 via line 390. A Q output terminal of the flip-flop 370 is coupled to a D input terminal of flip-flop 400 via line 410. A Q' output terminal of flip-flop 400 is coupled to a jam-type clear input terminal (CLR) of flip-flop 360 via line 420. An output terminal of a logic 1 voltage source 430 is coupled to a D input terminal of flip-flop 360 via line 432. A Q output terminal of flip-flop 360 is coupled to a first input terminal of an OR gate 440. The output terminal of processor 142 (shown in FIG. 8) supplying the auxiliary trigger signal A is coupled to a second input terminal of OR gate 440 via line 144. An output terminal of OR gate 440 is in turn coupled to the input terminal of frequency divider 100 (shown in FIG. 8) via line 242.

Figure 11:
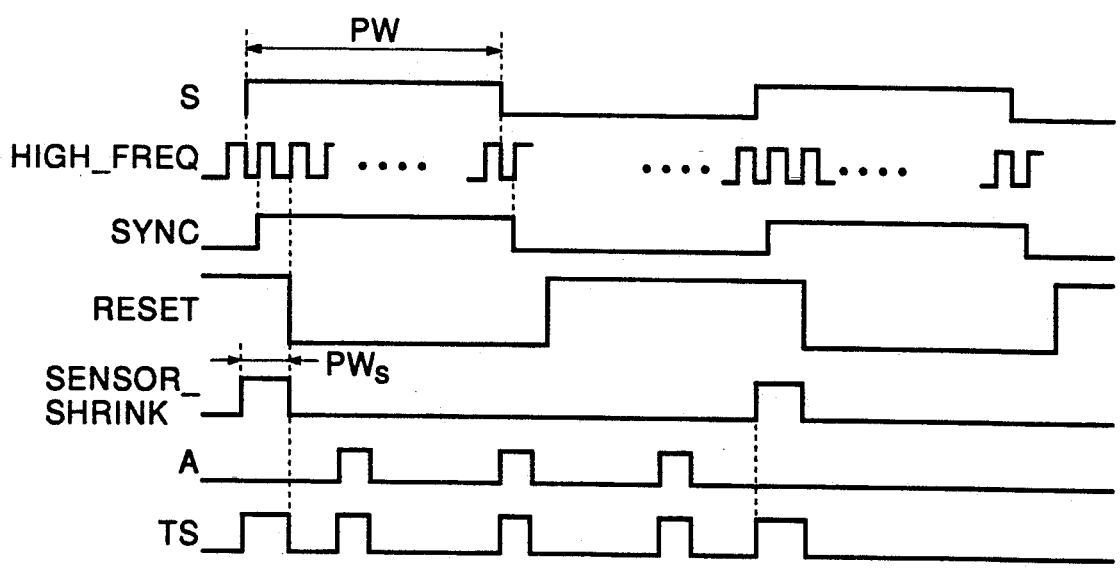
FIG. 11 illustrates the timing diagram of signals shown in FIG. 10.

To fully elucidate the operation of phase shifter block 146, the interoperation of the elements in FIG. 10 is described with reference to a timing diagram of FIG. 11. Clock signal source 380 supplies a high frequency clock signal (HIGH_FREQ) to the clock input terminals of flip-flops 370 and 400. The clock signal HIGH_FREQ is asynchronous to the sensor signal S (i.e. the HIGH_FREQ and S signals are not in phase) which is supplied to the clock input terminal of flip-flop 360 and to the D input terminal of flip-flop 370 via line 92. The frequency of the clock signal HIGH_FREQ is much greater than the frequency of the sensor signal S and only a few pulses of the clock signal HIGH_FREQ (not drawn to scale) are shown in FIG. 11.

A positive transition in the sensor signal S, i.e. transition from logic level 0 to logic level 1, causes a positive transition in a synchronization signal SYNC at the Q output terminal of flip-flop 370, which is triggered by a positive transition of the clock signal HIGH_FREQ at the clock input terminal of flip-flop 370. At the same time, the positive transition in the sensor signal S triggers flip-flop 360 to transfer the logic level of a pulse start signal (PST), which is always held at logic level 1, at the D input terminal of flip-flop 360 to the Q output terminal of the flip-flop 360. A short pulse sensor signal SENSOR_SHRINK at the Q output of flip-flop 360 is thus synchronized to the sensor signal S. The logic level 1 in the synchronization signal SYNC, which appears at the D input terminal of flip-flop 400, is transferred to the Q output terminal of flip-flop 400 at the next positive transition of the clock signal HIGH_FREQ. At the same time, a reset signal RESET appearing at the Q' output terminal of flip-flop 400 undergoes a negative transition, i.e. transition from logic level 1 to logic level 0. Since the reset signal RESET appears at the jam-type clear input terminal of flip-flop 360, the negative transition in the reset signal RESET immediately causes a negative transition in the short pulse sensor signal SENSOR_SHRINK at the Q output of flip-flop 360. The short pulse sensor signal SENSOR_SHRINK remains at logic level 0 until the next positive transition in the sensor signal S. The period of the short pulse signal SENSOR_SHRINK is thus equal to the period of the sensor signal S. However, the pulse width PWs of the pulse sensor signal SENSOR_SHRINK is defined by the positive transition of the sensor signal S and by the second positive transition of the clock signal HIGH_FREQ. Since the frequency of the clock signal HIGH_FREQ is much greater than the frequency of the sensor signal S, the duty cycle of the short pulse sensor signal SENSOR_SHRINK is much smaller than the duty cycle of the sensor signal S. As a result, collision between the pulses of the short pulse sensor signal SENSOR_SHRINK at the first input terminal of OR gate 440 and the pulses of the auxiliary trigger signal A, supplied to the second input terminal of OR gate 440 via line 144, is effectively eliminated. FIG. 11 shows, by way of example, the insertion of three additional pulses in the auxiliary trigger signal A into the trigger signal TS at the output terminal of OR gate 440. It is assumed that the width of the auxiliary trigger signal pulses, generated by processor 142 (FIG. 8) is short compared to the length of the logic level 0 part of the sensor signal period Ts. If this is not so, the pulse width of the additional pulses in the auxiliary trigger signal A may be shortened in the manner analogous to the procedure described above.

Referring again to FIG. 8, in another embodiment of the invention, phase shifter block 146 in FIG. 8, which may be an Exclusive-OR gate, outputs a pulse in the trigger signal TS if only one pulse occurs at either of its two inputs. To effect a 90 degree phase shift in the feedback signal F, processor 142 generates a pulse in the auxiliary trigger signal A at the first input to phase shifter block 146 to coincide with a pulse in the sensor signal S at the second input to the phase shifter block. A pulse in the trigger signal TS on line 242 is inhibited, i.e. prevented from occurring, and the state of frequency divider 100 remains the same. As a result, the next transition in the feedback signal F is delayed by 90 degrees. In a similar manner, the phase of the feedback signal F can be shifted by 180 degrees if two pulses in the trigger signal TS are inhibited, and by 270 degrees if the number of the inhibited pulses is three. Since both the command signal R and the feedback signal F are periodic, the desired phase alignment between the reference pulse edge RS and the command signal R may be achieved by either insertion or inhibition of an appropriate number of additional pulses in the trigger signal TS.

Regardless of whether the pulse insertion or the pulse inhibition approach is used, result is a corresponding phase shifting of feedback signal F at the output of frequency divider 100. The resultant phase error E drives the phase locked loop servomechanism 70 until phase alignment between command signal R and feedback signal F is re-established.

Once each disk drive 20 of disk array 22 has undergone the above steps in the synchronization process and is in phase lock with respect to the desired edge of sensor signal S in proximity to reference sector 124 as defined by the servowritten data and position format common to all the disk drives in disk array 22, the entire disk array can easily be synchronized to common master command signal M which, for example, can be provided as command signal R of any one of disk drives 20 in the disk array.

The foregoing description of the preferred embodiment is offered solely by way of illustration of the underlying principles of the invention. Many changes, modifications, and variations apparent to those skilled in the art may suggest themselves and are to be taken as embraced within the spirit and the scope of the appended claims.

What is claimed is:

1. A disk drive, comprising:
   a spindle motor;
   a disk mounted on said spindle motor;
   a sensor coupled to said spindle motor to generate a sensor signal having multiple pulses per revolution of said spindle motor corresponding to equally-separated angular positions thereof;
   means for controlling the drive current provided to said spindle motor in a manner effective to phase-align an arbitrary pulse of a phase shifted sensor signal with a command reference signal received by said controlling means whose frequency equals the desired rotational frequency of said spindle;
   means for generating a reference position signal indicating a predetermined angular position of said disk;
   a timer to measure the phase difference between said command reference signal and said reference position signal;
   means for determining from the measured phase difference a number of consecutive pulses by which said sensor signal should be phase-shifted to phase-align said command reference signal and said reference position signal; and
   a phase shifter to phase-shift said sensor signal by the determined number of pulses to produce said phase shifted sensor signal.

2. A disk drive according to claim 1, wherein said determining means comprises:
   a memory containing a table of time values and a table of pulse numbers;
   a processor coupled to said timer and to said memory to compare the measured phase difference to said time values in order to determine a closest time value thereto, and to retrieve a pulse number associated with the closest time value.

3. A disk drive according to claim 1, wherein said reference position signal generating means comprises:
   a pattern written at a reference position on a surface of said disk;
   a read head associated with said disk; and
   a head position detector coupled to said read head to detect said pattern and to generate said reference position signal in response to the detection thereof.

4. A disk drive according to claim 1, wherein said sensor comprises multiple Hall effect sensors mounted on said spindle motor.

5. A disk drive according to claim 1, wherein said sensor comprises means for sensing the back EMF on the windings of said spindle motor.

6. A disk drive according to claim 1, wherein said controlling means comprises:
   a phase detector coupled to said phase shifter to generate an error signal proportional to the phase difference between the phase-shifted sensor signal and said command reference signal;
   a loop filter coupled to said phase detector to generate a filtered control signal in response to said error signal; and
   power drivers coupled to said loop filter and to said spindle motor to provide current proportional to said filtered control signal to the windings of said spindle motor.

7. A disk drive, comprising:
   a spindle motor;
   a sensor coupled to said spindle motor to generate a sensor signal having multiple pulses per revolution of said spindle motor corresponding to equally-separated angular positions thereof;
   a disk mounted on said spindle motor having a pattern written at a reference position on a surface thereof;
   a read head associated with said disk;
   a head position detector coupled to said read head to detect said pattern and to generate a reference position signal in response to the detection thereof;
   a trigger pulse modifier coupled to said sensor and said head position detector to generate a trigger signal in response to said sensor signal, said reference position signal, and a command reference signal to be supplied thereto, said trigger pulse modifier having (i) a timer to measure the phase difference between said command reference signal and said reference position signal, (ii) means for determining from the measured phase difference a number of pulses by which said sensor signal should be phase-shifted to phase-align said command reference signal and said reference position signal, and (iii) a phase shifter to produce said trigger signal by phase-shifting said sensor signal by the determined number of pulses;
   a frequency divider coupled to said trigger pulse modifier to generate a feedback signal by dividing said trigger signal by a number equal to the number of pulses of said sensor signal per revolution of said spindle;
   a phase detector coupled to said frequency divider to generate an error signal proportional to the phase difference between said feedback signal and said command reference signal;
   a loop filter coupled to said phase detector to generate a filtered control signal in response to said error signal; and
   power drivers coupled to said loop filter and to said spindle motor to provide current proportional to said filtered control signal to the windings of said spindle motor.

8. A method of operating a disk drive, comprising the steps of:
   generating a sensor signal from a sensor coupled to a spindle motor in said disk drive, said sensor signal having multiple pulses per revolution of said spindle motor corresponding to equally-separated angular positions thereof;
   controlling the drive current provided to said spindle motor in a manner effective to phase-align an arbitrary pulse of a phase shifted sensor signal with a command reference signal whose frequency equals the desired rotational frequency of said spindle motor;
   generating a reference position signal indicating a predetermined angular position of a disk mounted on said spindle motor;
   measuring the phase difference between said command reference signal and said reference position signal;
   determining from the measured phase difference a number of consecutive pulses by which said sensor signal should be phase-shifted to phase-align said command reference signal and said reference position signal; and
   phase-shifting said sensor signal by the determined number to produce said phase shifted sensor signal.

9. A method according to claim 8, wherein said phase-shifting step comprises the step of inserting the determined number of pulses into said sensor signal.

10. A method according to claim 8, wherein said phase-shifting step comprises the step of inhibiting the determined number of pulses in said sensor signal.

* * * * *